United States Patent
Katz et al.

(10) Patent No.: US 7,275,081 B1
(45) Date of Patent: Sep. 25, 2007

(54) MANAGING STATE INFORMATION IN A COMPUTING ENVIRONMENT

(75) Inventors: David M. Katz, Santa Cruz, CA (US); Dennis C. Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 847 days.

(21) Appl. No.: 10/457,814

(22) Filed: Jun. 9, 2003

Related U.S. Application Data

(60) Provisional application No. 60/388,125, filed on Jun. 10, 2002.

(51) Int. Cl.
*G06F 15/16* (2006.01)
(52) U.S. Cl. .............. 709/203; 709/238; 707/101; 707/100
(58) Field of Classification Search ........ 709/203, 709/229, 238; 707/102, 101, 100
See application file for complete search history.

(56) References Cited

U.S. PATENT DOCUMENTS 6,633,544 B1 * 10/2003 Rexford et al. ............ 370/238
6,671,694 B2 * 12/2003 Baskins et al. ............ 707/102
6,799,319 B2 * 9/2004 Van Loo .................... 719/328
6,965,903 B1 * 11/2005 Agarwal et al. .......... 707/104.1

* cited by examiner

*Primary Examiner*—William Vaughn
*Assistant Examiner*—Djenane Bayard
(74) *Attorney, Agent, or Firm*—Shumaker & Sieffert, P.A.

(57) ABSTRACT

A software module operating within a network device, such as an operating system, manages state information within hierarchically ordered and temporally-linked data structure. The software module sends state change messages to other software modules within the network device, referred to as consumers, in an order that corresponds to the hierarchical order and the temporal linking. The data structure may comprise a plurality of objects to store state information. The operating system may receive event messages that indicate a change to the state information. The objects may be hierarchically linked in accordance with a hierarchy representing relationships of event messages. The objects may be temporally linked in accordance with the order in which the operating system receives event messages. The operating system may traverse the data structure according to the temporal and hierarchical links to select state change messages to send to a consumer.

12 Claims, 9 Drawing Sheets

MANAGING STATE INFORMATION IN A COMPUTING ENVIRONMENT

This application claims priority from U.S. provisional application Ser. No. 60/388,125 filed Jun. 10, 2002, the entire content of which is incorporated herein by reference.

TECHNICAL FIELD

The invention relates to computing environments and, more particularly, to managing the state information within a computer network or other computing environment.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network referred to as routers maintain tables of information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The physical connection between devices within the network is generally referred to as a link. A router uses interface cards (IFCs) for receiving and sending data packets via network links. These IFCs are installed in ports known as interfaces and are configured using interface configurations.

Generally, a router may maintain state information. For example, a router may maintain state information representing the current the state of the interface between that router and the network. Such state information may include information representing the state of one or more IFCs, such as the current configuration of one or more IFCs. A router may also, for example, maintain state information representing the state of one or more forwarding engines, one or more routing engines, or other resources within the router.

In particular, a process operating within a router, such as an operating system, may maintain the state information and communicate changes to state information to various other processes within the router. These other processes are sometimes referred to as "consumers," because they are the consumers of the state information maintained by the operating system. These consumers use state information when performing their various functions.

As the complexity of conventional networks has increased in recent years, management of the state information within a router or other network device has likewise become a significant challenge. Some existing methods for managing state information involve caching the information within the operating system, and issuing state change notifications to the software modules within the router. In response, the software modules retrieve the state information from the operating system.

These existing methods may be adequate if the rate of state change is relatively low. When the rate of state change increases, however, the rate of generation of state change messages may exceed the capacity of the consumers to receive and process the state information. In addition, the generation of state change messages may exceed the capacity of the communication channel between the sender and the consumer to carry messages, and may exceed the capacity of the sender to store messages. Thus, as the rate of state change within the computing network increases, these existing methods consume an increasing amount of device or network increases, these existing methods consume an increasing amount of device or network resources.

SUMMARY

In general, the invention is directed to techniques for managing state information within a network device, such as a router. According to the principles of the invention, a software module within the router, such as an operating system, manages state information within a temporally-linked and hierarchically ordered data structure. This data structure allows the operating system to communicate state change messages to other processes within the router, referred to as consumers, in accordance with a hierarchical relationship between state changes events, as well as a temporal order of the events. In addition, the data structure allows the operating system to consume a reduced amount of memory resources for managing the state information. Furthermore, the required amount of resources does not vary with the rate of state change.

In particular, the operating system may store state information within objects. The operating system may link the objects in accordance with a hierarchy representing relationships of event messages that indicate changes to the state information, and in accordance with the order in which the event messages are received by the operating system. When the operating system receives a request for state information from a consumer, it may traverse the data structure in an order in accordance with the hierarchical and temporal links between the objects, and deliver state change messages in accordance with this order.

One embodiment consistent with the principles of the invention is directed to a method comprising managing state information within a temporally-linked and hierarchically ordered data structure, and communicating changes to the state information to a consumer according to the data structure. The state information may be stored within a plurality of objects. The objects may be linked in accordance with a hierarchy representing relationships of event messages that indicate changes to the state information. The objects may be linked by setting the hierarchical pointers to link the objects in accordance with the hierarchy. The objects may also be linked in accordance with an order in which event messages are received. Changes to the state information may be communicated to the consumer in accordance with the hierarchical pointers and temporal pointers linking the objects.

Another embodiment consistent with the principles of the invention is directed to a computer-readable medium comprising a temporally-linked and hierarchically ordered data structure to store state information. The data structure may comprise a plurality of objects to store the state information. The objects may include hierarchical pointers to link the objects in accordance with a hierarchical relationship of event messages that indicate changes to the state information, and temporal pointers to link the objects in accordance with an order in which event messages are received by a processor. The computer-readable medium may also include a consumer pointer to point into a data structure.

Another embodiment consistent with the principles of the invention is directed to a network device comprising a computer-readable medium comprising a temporally-linked and hierarchically ordered data structure to store state information, and a processor to manage the state information within the data structure and communicate changes to the state information to a consumer according to the data structure. The consumer may be a software process operating within the network device. The data structure comprises a plurality of objects to store the state information. The objects may include hierarchical pointers and temporal pointers. The processor may set the hierarchical pointers to link the objects in accordance with a hierarchy representing relationships of the event messages, set the temporal pointers to link the objects in accordance with an order in which the event messages are received, and communicate changes to the state information to consumer in accordance with the hierarchical pointers and temporal pointers linking the objects.

Another embodiment consistent with the principles of the invention is directed to a computer-readable medium comprising instructions to cause a processor to manage state information within a temporally-linked and at least partially ordered data structure, and communicate changes to the state information to a consumer according to the data structure. The data structure comprises a plurality of objects, and the instructions that cause a processor to manage the state information comprise instructions to cause a processor to store state information within the objects. The objects may include hierarchical pointers and temporal pointers. The computer-readable medium may further comprise instructions that cause the processor to receive event messages that indicate changes to the state information, set the hierarchical pointers to link the objects in accordance with a hierarchy representing relationships of the event messages, and set the temporal pointers to link the objects in accordance with an order in which the event messages are received. The computer-readable medium may comprise instructions that cause the processor to communicate changes to the state information to consumer in accordance with the hierarchical pointers and temporal pointers linking the objects.

Embodiments consistent with the principles of the invention may offer a number of advantages. For example, some consumers must receive and process the state change messages that indicate state change events in an order established by hierarchal relationships between state change events. Maintaining the state information in a hierarchically ordered data structure advantageously allows the operating system to deliver state change messages in the order that these consumers must receive them. Maintaining the state information in a temporally-linked data structure allows the operating system to easily keep track of which state change messages a consumer has not received. Rather than generating state change messages each time an event occurs, and storing these messages until consumers are ready to read them, the operating system may store state change information in the data structure and, when a consumer is ready to be updated, traverse the data structure from the point in the temporally-linked list when the consumer was last updated to update the consumer. This may reduce the amount of memory resources required to communicate state changes to consumers. Additionally, moving objects whose state information is being rapidly changed to the end of the temporally-linked list may prevent a consumer from receiving redundant state change messages pertaining to an object whose state information has been changed multiple times since the time that the consumer was last updated. This may further reduce the amount of memory resources required to communicate state changes to consumers.

The detail of one or more embodiments of the invention are set forth in the accompanying drawings and the description below. Other features, objects, and advantages of the invention will be apparent from the description and drawings, and from the claims.

DETAILED DESCRIPTION

Figure 1:
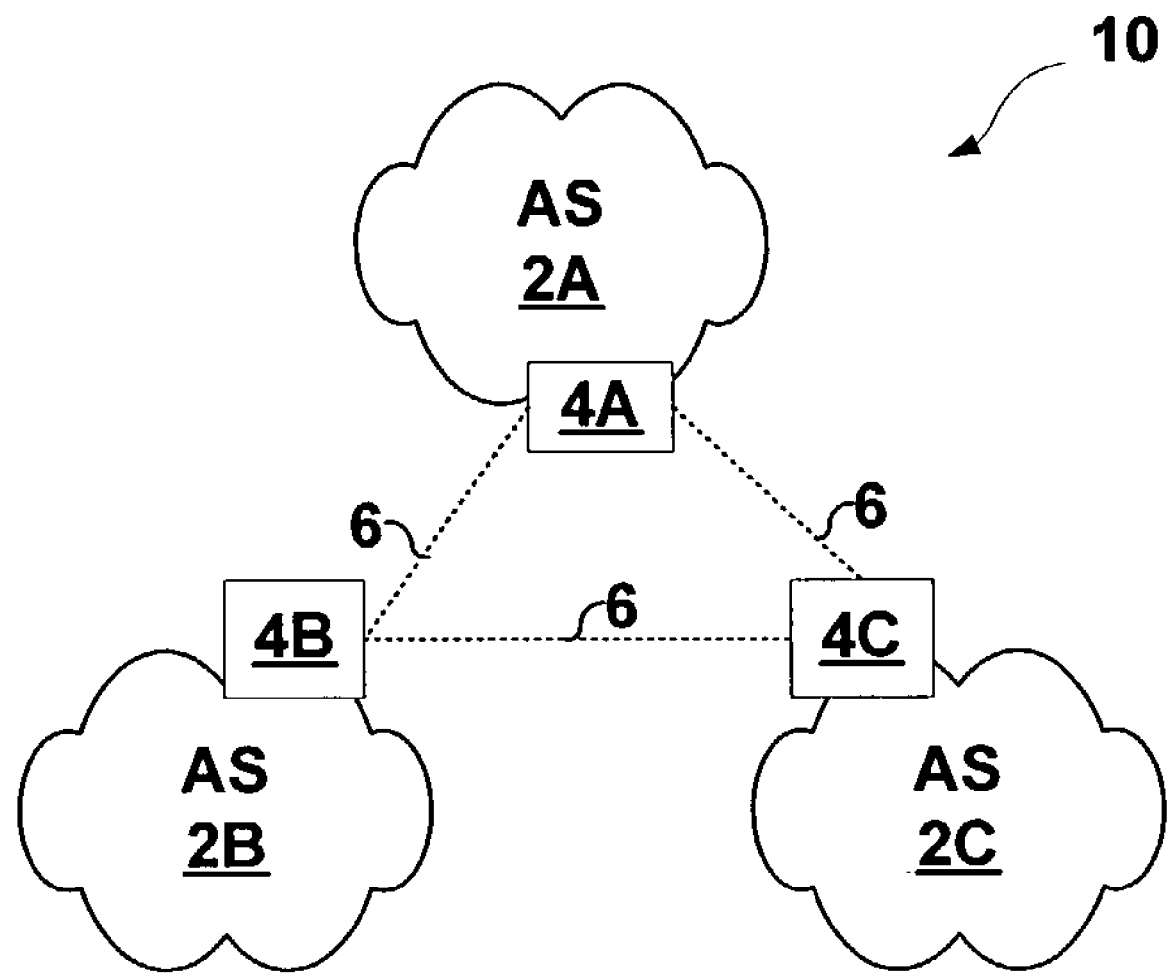
FIG. 1 illustrates a group of autonomous systems (AS) forming a computer network.

FIG. 1 illustrates a group of autonomous systems 2A-2C (herein autonomous systems 2) forming a computer network 10. Each of autonomous systems 2 represents an independent administrative domain having a variety of networked resources capable of packet-based communication. For example, autonomous systems 2 may include servers, workstations, network printers and faxes, gateways, routers, and the like. Each of autonomous systems 2 includes at least one router 4 for sharing routing information with, and forwarding packets to, the other autonomous systems via links 6.

As described herein, routers 4 manage state information within hierarchically ordered and temporally-linked data structures. For example, an operating system executing within each of routers 4 may manage the data structures, and may inform various software processes, referred to herein as "consumers," of any change to the state information. The operating system may, for example, receive and maintain information representing the state of one or more interface cards, one or more forwarding engines, one or more routing engines, or other resources within the router.

In the event the state information changes, the operating system may send alert messages to the consumers indicating that changes to the state information have occurred. In response, the consumers may issue requests to retrieve the updated state information. When the operating system receives such a request, the operating system may traverse the hierarchically ordered and temporally-linked data structure and issue state change messages to the requesting consumer. The hierarchically ordered and temporally-linked data structure generally allows the operating system to deliver state change messages in the order that the state changes occurred, with deference to an order established by the hierarchy.

Some state change events may be related hierarchically. In general, such events must be processed not only with deference to their occurrence in time, but also to their hierarchical relationships. More specifically, some consumers must receive and process the state change messages that indicate such events in an order established by the hierarchal relationships. Maintaining the state information in a hierarchically ordered data structure advantageously allows the operating system to deliver state change messages in the order that these consumers must receive them.

Figure 2:
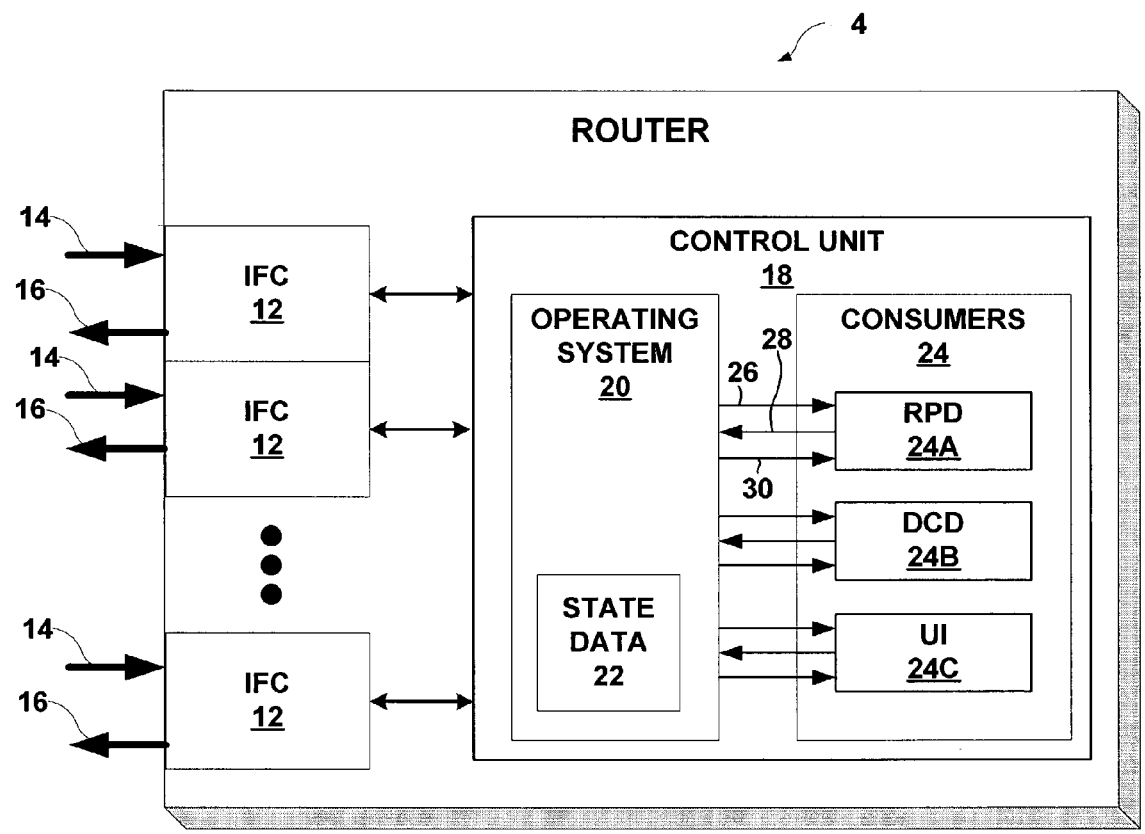
FIG. 2 is a block diagram illustrating an example router consistent with the principles of the invention.

FIG. 2 is a block diagram illustrating and example router 4 consistent with the principles of the invention. In the exemplary embodiment illustrated in FIG. 2, router 4 includes one or more interface cards (IFCs) 12 for sending and receiving packets using network links 14 and 16. IFCs 12 are typically coupled to network links 14, 16 via a number of interface ports. In general, a control unit 18 within router 4 receives inbound packets from network links 14 via IFCs 12, extracts information from the received packets, and forwards the packets on network links 16 via IFCs 12 based on the extracted information.

Control unit 18 may comprise an operating system 20 executing on a programmable processor (not shown). Operating system 20 provides a multi-tasking operating environment for execution of a number of software processes, such as consumers 24. An example of such an operating system is FreeBSD, which is an advanced UNIX operating system that is compatible with a number of programmable processors.

Consumers 24 may include a routing protocols daemon (RPD) 24A, device control daemon (DCD) 24B, and a User Interface process (UI) 24C, as illustrated by FIG. 2. In general, RPD 24A implements protocols for exchanging route information with other routing devices and for performing route resolution to maintain a routing table (not shown), DCD 24B is responsible for managing the physical configuration of the router, such as the powering up the router, recognizing the hardware components of the router, bringing hardware components to a functional state to allow for setup of the logical components, and the like. UI 24C provides an interface by which a remote system administrator or script can control and configure the router.

Operating system 20 maintains state information as state data 22. State data 22 may, for example, represent the current state of the interface between router 4 and network 10, which may include the current configuration of IFCs 12. State data 22 may comprise a hierarchically ordered and temporally-linked data structure. State data 22 may be stored in memory, such as a RAM, located on control unit 18 or external to the control unit 18.

Operating system 20 communicates with IFCs 12 and packet forwarding hardware (not shown), and receives event messages indicative of a change of the state of the interface between router 4 and network 10. When operating system 20 receives an event message, operating system 20 may update state data 22 by reconfiguring the data structure and updating the data stored within the data structure. Operating system 20 may inform consumers 24 of the current state of the interface so that consumers 24 may perform their various functions. In particular, a consumer 24 may receive state change messages from operating system 20 indicating the changes to the state of the interface that occurred since the last time it was updated with the current state of the interface.

After operating system 20 receives an event message indicating a change of state and updates state data 22, operating system 20 may issue an alert message 26 to consumers 24 indicating that the state of the interface has changed. When operating system 20 receives a request 28 from a consumer 24 for state information, operating system 20 may traverse the hierarchically ordered and temporally-linked data structure of state data 22 and issue an update message 30 to the consumer 24 containing state change messages that it needs and has not already received. The hierarchically ordered and temporally-linked data structure of state data 22 generally allows operating system 20 to deliver state change messages in the order that the state changes occurred, with deference to an order established by the hierarchy, as will be described in greater detail below.

Figure 3A:
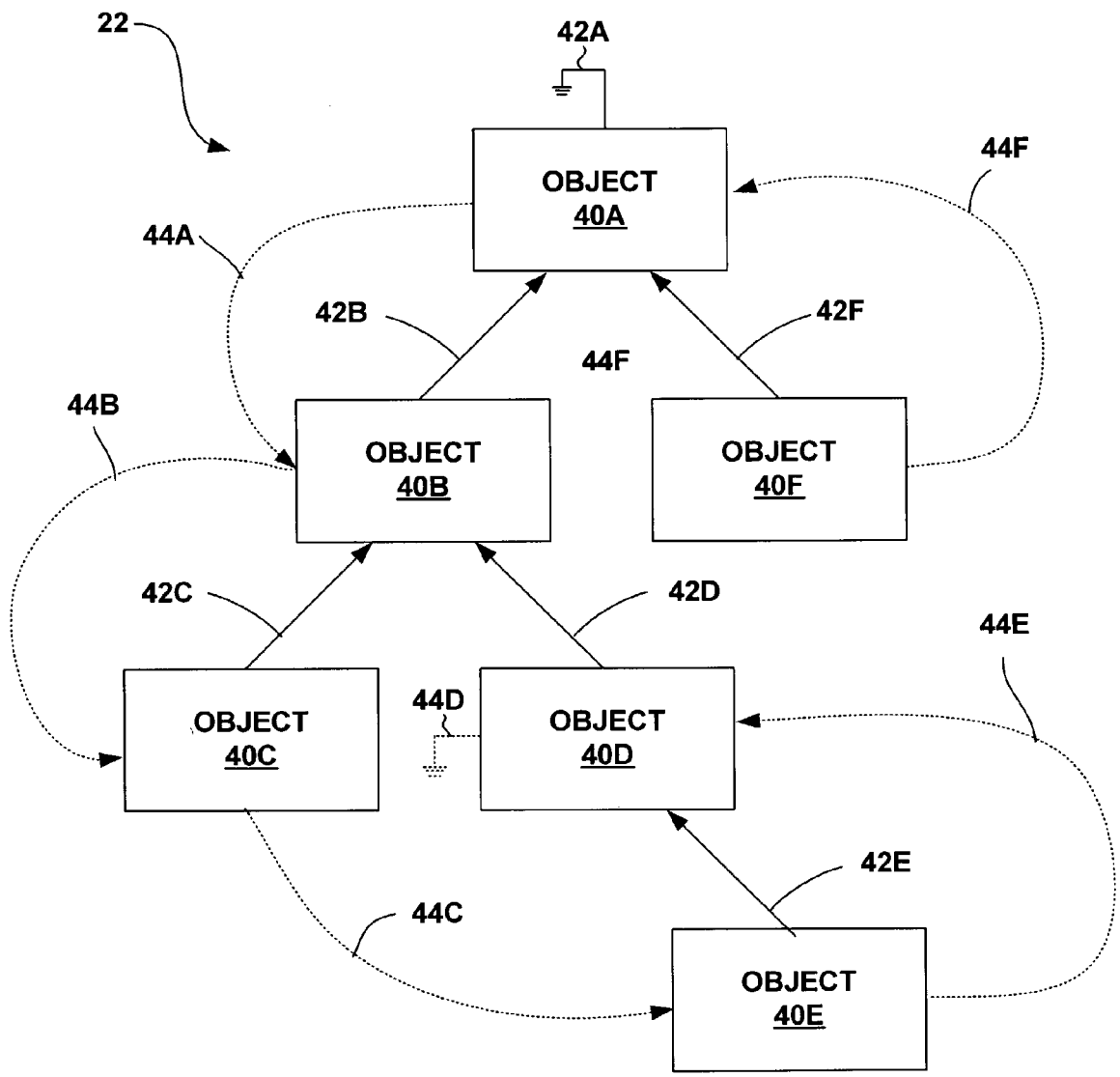
FIG. 3A is a block diagram illustrating an example hierarchically ordered and temporally-linked data structure for maintaining state information.

FIG. 3A is a block diagram illustrating an example hierarchically ordered and temporally-linked data structure of state data 22 for maintaining state information. State information may be stored in the data structure of state data 22 within multiple objects 40. Objects 40 are hierarchically related. The hierarchical relationships between objects 40 may be described as parent-child relationships. The hierarchical relationships are determined when the objects are created. Objects 40 are hierarchically related because consumers 24 may need to receive messages regarding changes to the state information stored within a parent object before receiving messages regarding changes to the state information stored within the child objects of that parent object.

With respect to the configuration of an IFC 12 in particular, these objects may correspond to the various physical devices, logical interfaces, address families, and addresses associated with the IFC 12. A physical device associated with the IFC 12 may be related to one or more logical interfaces, which may, in turn be related to one or more address families, which may, in turn, be related to one or more addresses. Consumers 24 may need to receive messages regarding changes to the state of a physical device before receiving messages regarding changes to the state of one or more of the logical interfaces related to that physical device, and messages regarding changes to the state of a logical interface before messages regarding changes to the state of one or more address families for that logical interface. Thus, these objects for an IFC 12 are hierarchically related from a physical device at the top of the hierarchy, to addresses at the bottom of the hierarchy.

The hierarchical relationships between objects 40 are maintained by hierarchical pointers 42, hereinafter represented by solid lines between objects, within each object 40. Specifically, in the exemplary data structure depicted in FIG. 3A, hierarchical pointers 42 within each child object point to the parent object of that child object. For example, hierarchical pointer 42B stored within object 40B points to object 40A, which is the parent of object 40B. The hierarchical pointer 42 within an object 40 that does not have a parent, such as pointer 42A within object 40A in this exemplary embodiment, is set to NULL.

Objects 40 are also temporally-linked by temporal pointers 44, hereinafter represented by dotted lines between objects, within each object 40. Temporal pointers 44 link objects 40 in the order in which changes to the state information stored within objects 40 occurred. For example, because a change in state information stored within object 40F was followed by a change in the state information stored within object 40A, temporal pointer 44F stored within object 40F points to object 40A. The temporal pointer 44 within the object 40 whose state information was most recently changed, in this exemplary embodiment pointer 44D within object 40D, is set to NULL.

Figure 3B:
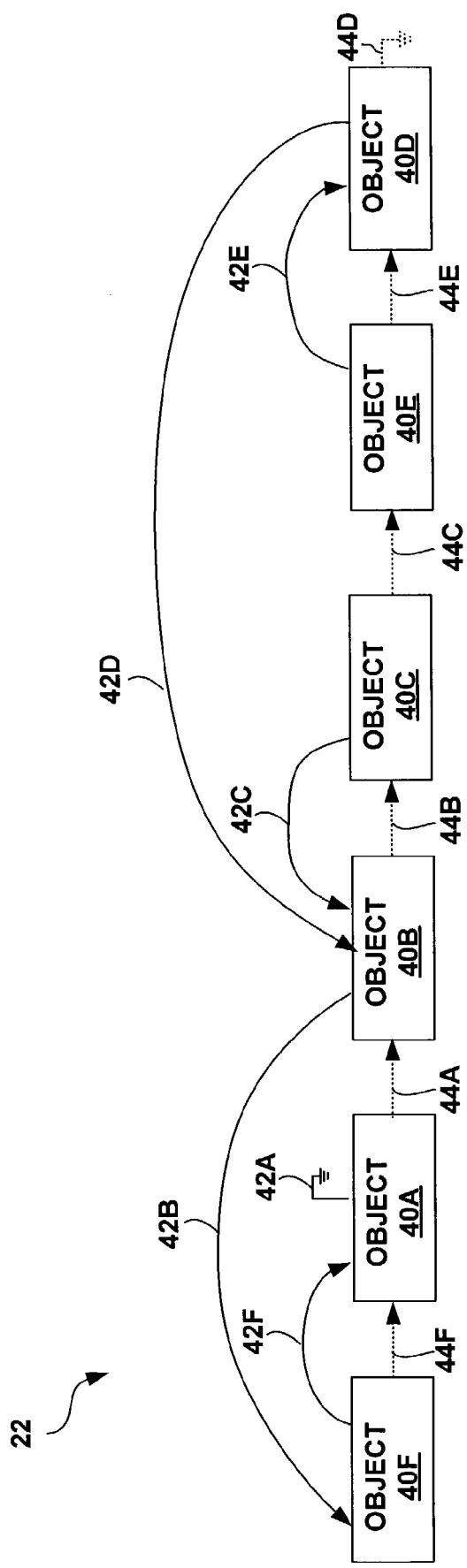
FIG. 3B is a block diagram providing another view of the data structure of FIG. 3A.

FIG. 3B is a block diagram providing another view of the data structure of FIG. 3A. In particular, FIG. 3B depicts data structure 22 as a temporally-linked list of objects 40 with hierarchical pointers 42 for maintaining the hierarchical order of the data structure. The temporally-linked list links objects 40 in the order in which changes to the state information stored within objects 40 occurred. Thus, the object 40F, whose state information was last changed least recently, is connected by temporal pointer 44F to the object 40A, whose state information was next least recently changed. Accordingly, objects 40 can be linked by temporal pointers 44 in this manner. The exemplary temporally-linked list of this embodiment ends with object 40D, whose state information was changed most recently.

Figure 4A:
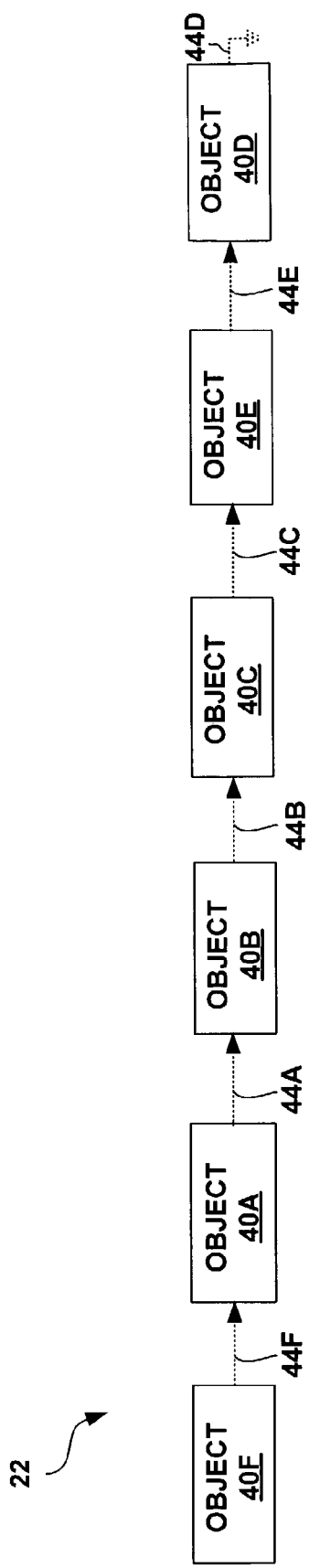
FIG. 4A is a block diagram depicting the temporally-linked list of objects of FIG. 3B.
Figure 4B:
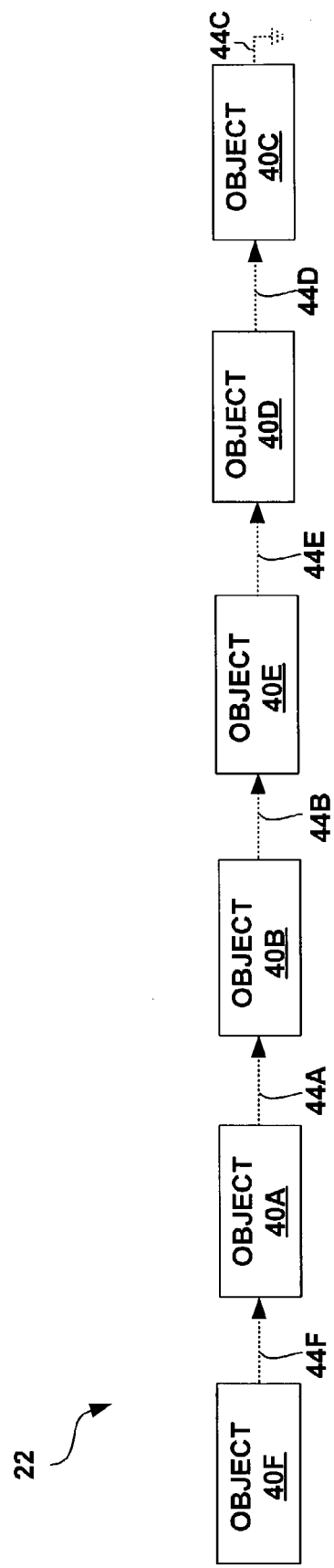
FIG. 4B is a block diagram depicting the configuration of the temporally-linked list of objects of FIG. 4A after a change in the state information within an object.

FIG. 4A is a block diagram depicting the temporally-linked list of objects 40 of FIG. 3B. FIG. 4B is a block diagram depicting the configuration of the temporally-linked list of objects 40 of FIG. 4A after a change in the state of object 40C. Hierarchical pointers 42 are, for the sake of clarity, not shown in FIGS. 4A and 4B.

As described above, in a temporally-linked list consistent with the principles of the invention, objects 40 may be linked in the order in which changes to the state information stored within objects 40 occur. FIGS. 4A and 4B illustrate that when operating system 20 changes the state information within one of objects 40, operating system 20 moves the changed object to the end of such a linked list. Thus, FIG. 4A represents the linked list at a time $t_0$. At some later time $t_1$, operating system 20 receives an event message affecting the state of object 40C, changes the state information within object 40C, and reorders the linked list by moving object 40C to the end of the linked list. FIG. 4B represents the linked list at a time $t_2$ after operating system 20 has moved object 40C to the end of the linked list.

Operating system 20 may reorder the linked list by resetting the addresses of temporal pointers 44. In the example illustrated by FIGS. 4A and 4B, object 40C is moved to the end of the linked list by resetting the addresses of temporal pointers 44B, 44C and 44D. Temporal pointer 44B, which had a time $t_0$ pointed to object 40C, is set to point to the next object 40 on the list, object 40E. Temporal pointer 44C, which had time $t_0$ pointed to object 40E, is set to NULL because object 40C is now at the end of the list. Temporal pointer 44D, which had at time $t_0$ been set to NULL because object 40D was then at the end of the list, is set to point to object 40C.

As will be described in more detail below, this manner of temporally linking objects 40 allows operating system 20 to easily keep track of which state change messages a consumer 24 has not received. Keeping track of which messages a consumer 24 has not yet received may be advantageous in numerous ways. Rather than generating state change messages each time an event occurs, and storing these messages until consumers 24 are ready to read them, an operating system 20 consistent with the principles of the invention may store state change information in the data structure and, when a consumer 24 is ready to be updated, traverse the data structure from the point in the temporally-linked list when consumer 24 was last updated to update the consumer 24. This may reduce the amount of memory resources required to communicate state changes to consumers 24. Additionally, moving objects whose state information is being rapidly changed to the end of the temporally-linked list may prevent a consumer 24 from receiving redundant state change messages pertaining to an object whose state information has been changed multiple times since the time that the consumer 24 was last updated. This may further reduce the amount of memory resources required to communicate state changes to consumers 24.

Figure 5A:
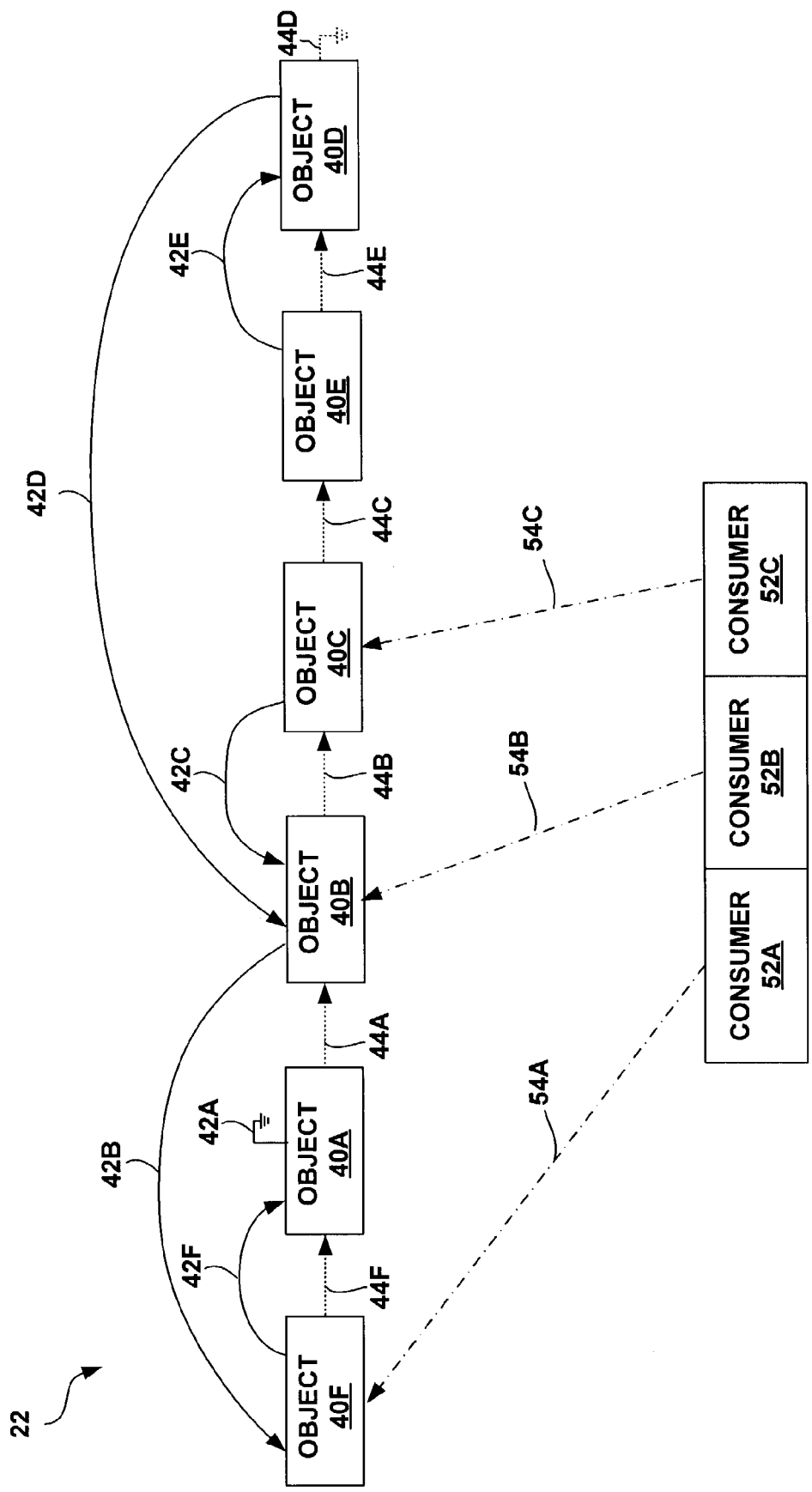
FIG. 5A is a block diagram illustrating consumer pointers that point into the temporally-linked list of the objects of FIG. 3B and indicate what state change messages the consumers have not received.

FIG. 5A is a block diagram illustrating consumer pointers 54, hereinafter represented by dash-dot lines, that point into the temporally-linked list of objects 40 of FIG. 3B and indicate to operating system 20 what state change messages the consumers 24 have not received. Operating system 20 may maintain a table of consumers 50, which may contain a consumer pointer 54 for each of consumers 52. Consumers 52 may correspond or be mapped to consumers 24.

Each consumer pointer 54 points to an object 40 within the data structure of state data 22. In particular each consumer pointer 54 points to the first object 40 within the temporally-linked list with state change information that the associated consumer 52 has not received. Consumer pointer 54A points to object 40F, indicating that consumer 52A has not received state change information contained within objects 40F, 40A, 40B, 40C, 40E and 40D. Consumer pointer 54B points to object 40B, indicating that consumer 52B has not received state change information contained within objects 40B, 40C, 40E and 40D. Consumer pointer 54C points to object 40C, indicating that consumer 52C has not received state change information contained within objects 40C, 40E and 40D.

If a consumer pointer 54 points to an object 40 that is moved to the end of the temporally-linked list, that consumer pointer 54 is set to point to the next object in the list. For example if, as illustrated in FIGS. 4A and 4B, object 40C is moved to the end of the list, consumer pointer 54C will be set to point to object 40E.

When operating system 20 receives a request for state information from a consumer 52, operating system 20 determines which object 40 the consumer pointer 54 associated with the consumer 52 is pointing to. As mentioned above, the hierarchical order indicated by hierarchical pointers 42 takes precedence over the temporal order indicated by temporal pointers 44. Thus, operating system will first follow hierarchical pointers 42 from the object 40 that consumer pointer 54 is pointing to. Operating system 20 will follow hierarchical pointers 42 from object to object until it reaches an object 40 whose current state information it has already received or an object 40 whose hierarchical pointer 42 is set to NULL. The consumer pointer 54 continues to point at the same object 40 while this occurs. Operating system 20 will then retrace its path identifying any state change messages that the consumer 52 needs to receive and has not received in the proper hierarchical order. Operating system 20 will then identify any state change messages that the consumer 52 needs to receive indicated by the object 40 that consumer pointer 54 is pointing at, and set the consumer pointer 54 to point at the next object 40 in the temporally-linked list. These steps may be repeated as consumer pointer 54 traverses the temporally-linked list. As consumer pointer 54 traverses the temporally-linked list, operating system 20 may encounter objects 40 whose state changes messages have already been identified or are not needed by the consumer 52. In that case, operating system may simply set the consumer pointer 54 to point at the next object 40 in the temporally-linked list.

Thus, in the example shown in FIG. 5A, the operating system will traverse the data structure as follows. If operating system 20 receives a request for state information from consumer 52A, operating system 20 will identify state change messages indicated by objects 40 in the following order: messages indicated by object 40A, messages indicated by object 40F, messages indicated by object 40B, messages indicated by object 40C, messages indicated by object 40D, and messages indicated by object 40E. If operating system 20 receives a request for state information from consumer 52B, operating system 20 will identify state change messages indicated by objects 40 in the following order: messages indicated by object 40B, messages indicated by object 40C, messages indicated by object 40D, and messages indicated by object 40E. If operating system 20 receives a request for state information from consumer 52C, operating system 20 will identify state change messages indicated by objects 40 in the following order: messages indicated by object 40C, messages indicated by object 40D, and messages indicated by object 40E.

Figure 5B:
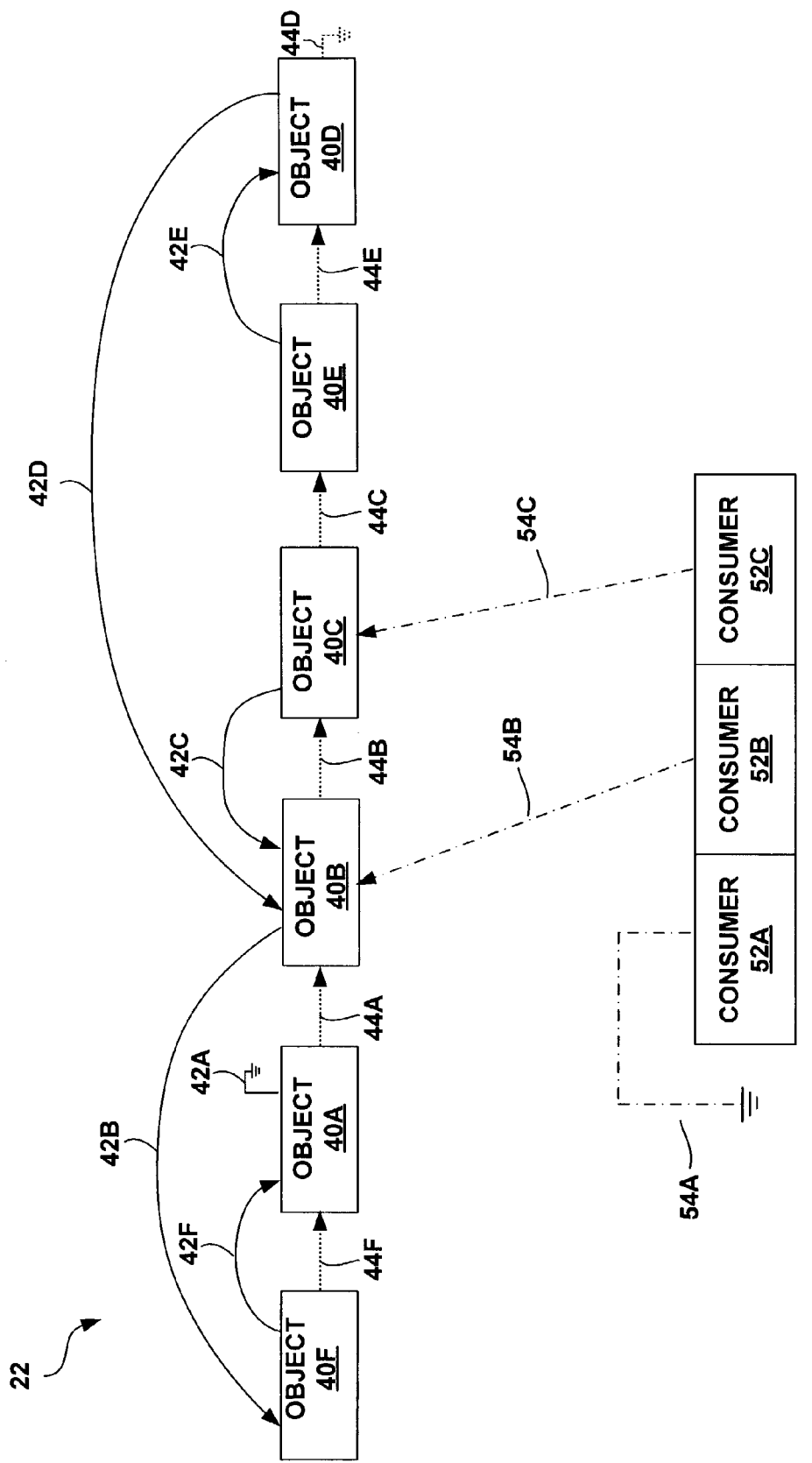
FIG. 5B is a block diagram depicting the consumer pointers of FIG. 5A after a consumer has received all current state change messages.

FIG. 5B is a block diagram depicting the consumer pointers 54 of FIG. 5A after consumer 52A has received all current state change messages. In this example, operating system 20 knows that it has traversed the entire temporally-linked list when it attempts to set consumer pointer 54A to point to the next object in the list after object 40D and discovers temporal link 44D is set to NULL. At that point, operating system 20 delivers all identified state change messages in the proper hierarchical and temporal order. Operating system 20 may deliver these individual state change messages as a single update message containing the individual state change messages in the proper hierarchical and temporal order. Additionally, as shown in FIG. 5B, operating system 20 sets the consumer pointer 54A to NULL when it delivers the update message. If operating system 20 then receives an event message and consequently moves object 40C to the end of the temporally-linked list, operating system 20 will set consumer pointer 54A to point to object 40C.

Figure 6:
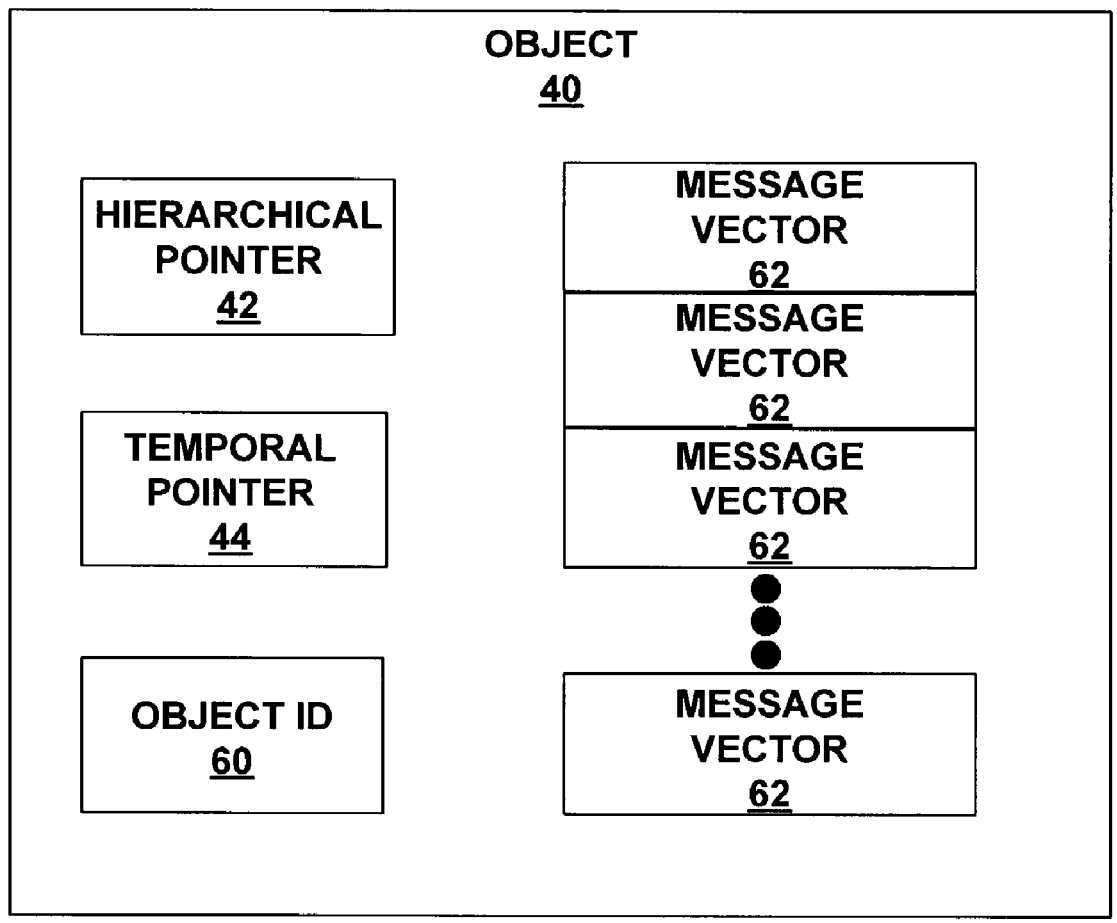
FIG. 6 is a block diagram illustrating an example of data contained within an object consistent with the principles of the invention.

FIG. 6 is a block diagram illustrating an example of data contained within an object 40 consistent with the principles of the invention. This data may include a hierarchical pointer 42 and a temporal pointer 44 as described above. Object 40 may also contain some data that identifies the object 40, referred to object ID 60. Object ID 60 may, for example, be used to identify object 40 in state change messages sent to consumers 24.

Object 40 may also contain a number or message vectors 62. Message vectors 62 may correspond to the various state change messages that operating system 20 may send to consumers 24. Operating system 20 may use message vectors 62 to keep track of which messages a consumer 24 has received, and to filter messages from the consumers 24 that it does not need to see.

Each message vector 62 may contain a variety of message-related information, including a number of bits, wherein each bit may correspond to a consumer 24. When operating system 20 receives an event message, it may determine what object or objects 40 the event message pertains to and what state change message or state change messages need to be sent to consumers 24. When operating system 20 identifies a state change message that needs to be delivered to consumers 24, it will reset the bits within the corresponding message vector 62. If a consumer 24 needs to see the message, operating system 20 will, for example, set the bit corresponding to that consumer 24 to 1. When operating system 20 traverses the data structure as described above, it will identify state change messages that a consumer 24 needs to receive but has not received by parsing message vectors 62 and determining whether the bit corresponding to the consumer 24 is set to 1. When operating system 20 message identifies a state change message that will be sent to the consumer 24, it will set the bit corresponding to the consumer 24 to 0. The present invention is not limited to the described bit convention. Use of a value of 0 to indicate that a consumer 24 needs to receive and has not received a state change message is within the scope of the present invention.

Figure 7:
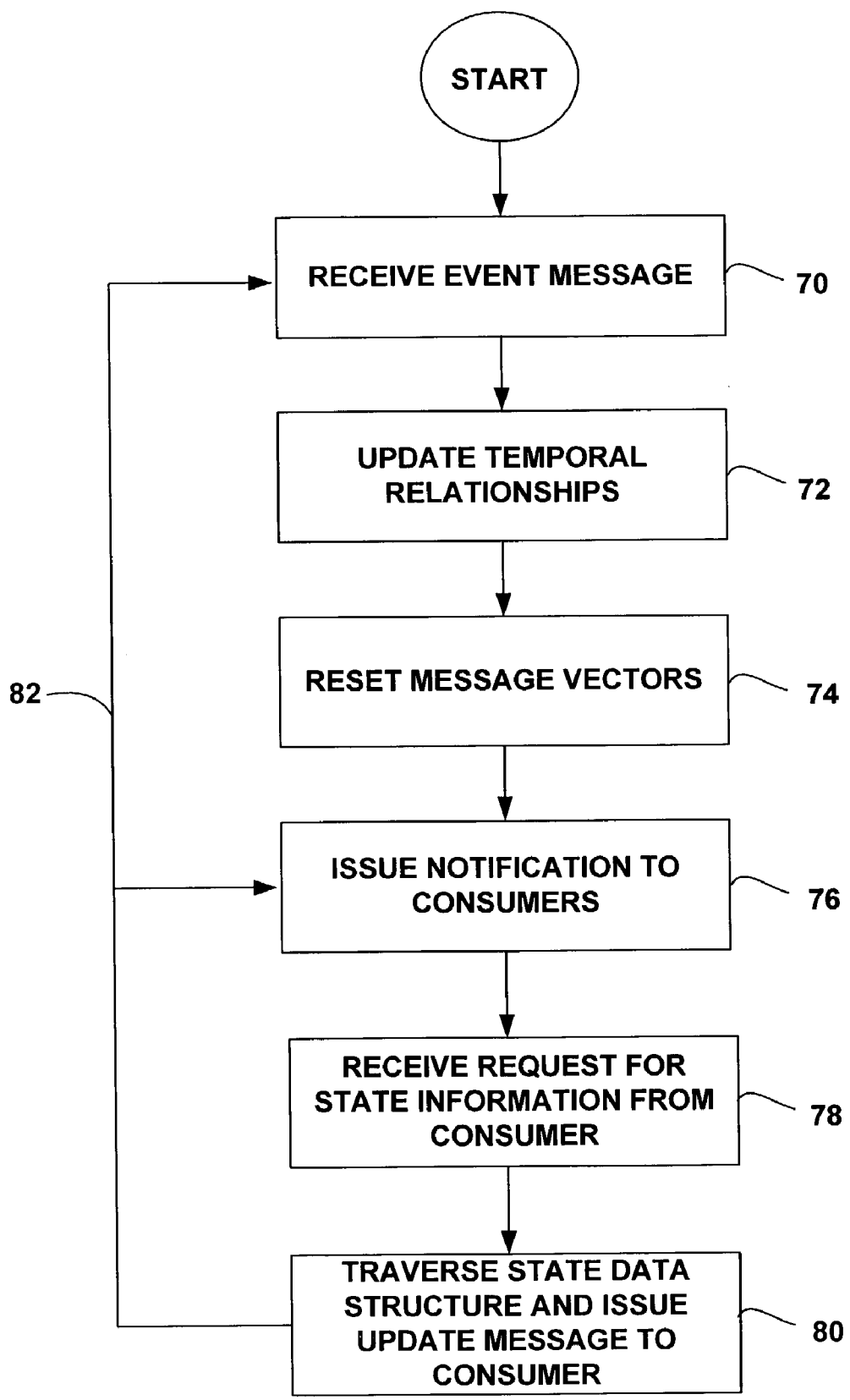
FIG. 7 is a flow chart illustrating an example method for maintaining state information and communicating state change messages to consumers.

FIG. 7 is a flow chart illustrating an example method for maintaining state information and communicating state change messages to consumers 24. This example method may be executed by an operating system 20 of router 4 described above. When operating system 20 receives an event message (70) indicating that the state of the interface has changed, operating system 20 will determine which object or objects 40 the event message pertains to and which state change message or state change messages need to be sent to consumers 24. Operating system 20 may then, as described above, update the temporal relationships between objects 40 to move the implicated object or objects 40 to the end of the temporally-linked list of the data structure of state data 20 by changing the addresses of temporal pointers 44 (72). Operating system 20 may also, as described above, reset the appropriate message vectors 62 (74), and issue a notification 26 to consumers 24 indicating that the state of the interface has changed (76). When operating system 20 receives a request 28 from a consumer 24 for state information (78), operating system 20 may, as described above, traverse the hierarchically ordered and temporally-linked data structure of state data 22 and issue and issue an update message 30 to the consumer 24 containing state change messages that it needs and has not already received (80). Operating system 20 may then receive a new request 28 or event message (82).

Various embodiments of the invention have been described. These and other embodiments are within the scope of the following claims.

The invention claimed is:

1. A computer-implemented method comprising: receiving, with a processor, event messages that indicate a change to state information; managing, with the processor, the state information within a temporally-linked and hierarchically ordered data structure stored within a computer-readable medium, wherein the data structure comprises a plurality of objects that include hierarchical pointers and temporal pointers, and wherein managing the state information comprises storing the state information within the objects, setting the hierarchical pointers to link the objects in accordance with a hierarchy representing relationships of the event messages, and setting the temporal pointers to link the objects in accordance with an order in which the event messages are received; and communicating with the processor, changes to the state information to a consumer according to the data structure, wherein communicating changes to the state information to a consumer comprises traversing the data structure in an order determined in accordance with the hierarchical pointers and temporal pointers, and delivering state change messages to the consumer in accordance with the order.

2. The method of claim 1, further comprising relinking the objects when event messages are received.

3. The method of claim 1, further comprising:
providing a consumer pointer that points into the data structure; and
traversing the data structure as a function of the consumer pointer.

4. The method of claim 1, further comprising:
receiving an event message;
determining whether to deliver the consumer a state change message that corresponds to the event message; and
storing an indication within an object as a function of the determination.

5. The method of claim 4, further comprising: receiving a request for the state information from the consumer; determining whether the indication is present in an object; and delivering the state change message as a function of the determination.

6. A device comprising:
a computer-readable medium comprising a temporally-linked and hierarchically ordered data structure to store state information; and
a processor to manage the state information within the data structure and communicate changes to the state information to a consumer according to the data structure,
wherein the data structure comprises a plurality of objects to store the state information,
wherein the objects include hierarchical pointers and temporal pointers,
wherein the processor receives event messages that indicate a change to the state information, sets the hierarchical pointers to link the objects in accordance with a hierarchy representing relationships of the event messages, and sets the temporal pointers to link the objects in accordance with an order in which the event messages are received, and
wherein the processor traverses the data structure in an order determined in accordance with the hierarchical pointers and temporal pointers, and delivers state change messages to the consumer in accordance with the order.

7. The device of claim 6, wherein the consumer is a software process operating within the device.

8. The device of claim 6, further including a consumer pointer to point into a data structure, and
wherein the processor traverses the data structure as a function of the position of the consumer pointer.

9. A computer-readable medium comprising instructions to cause a processor to:
manage state information within a temporally-linked and hierarchically ordered data structure; and communicate changes to the state information to a consumer according to the data structure wherein the data comprises a plurality of objects,
wherein the instructions that cause the processor to manage the state information comprise instructions to cause the processor to store state information within the objects, wherein the objects include hierarchical pointers and temporal pointers, wherein the medium further comprises instructions that cause the processor to receive event messages that indicate changes to the state information,
wherein the instructions that cause a processor to manage the state information comprise instructions that cause the processor to set the hierarchical pointers to link the objects in accordance with a hierarchy representing relationships, of the event messages, and set the temporal pointers to link the objects in accordance with an order in which the event messages are received, and
wherein the instructions that cause the processor to communicate changes to the state information comprise instructions that cause the processor to traverse the data structure in an order determined in accordance with, the hierarchical pointers and temporal pointers, and deliver state change messages to the consumer in accordance with the order.

10. A computer-implemented method comprising:
storing, within a computer-readable medium, state information within a plurality of temporally-linked and hierarchically ordered objects of a data structure, wherein the objects include hierarchical pointers and temporal pointers;
receiving, with a processor, event messages that indicate a change to the state information;
setting, with the processor, the hierarchical pointers to link the objects in accordance with a hierarchy representing relationships of event messages that indicate changes to the state information;
setting, with the processor, the temporal pointers to link the objects in accordance with an order in which the event messages are received;
traversing, with the processor, the data structure in an order determined in accordance with the hierarchical pointers and temporal pointers; and
communicating, with the processor, changes to the state information to consumer in accordance with the hierarchical pointers and temporal pointers linking the objects by delivering state change messages to the consumer in accordance with the order.

11. The method of claim 10, further comprising:
providing a consumer pointer that points into the data structure; and
traversing the data structure as a function of the consumer pointer.

12. The method of claim 10, further comprising:
determining whether to deliver the consumer a state change message that corresponds to the event message;
storing an indication within an object as a function of the determination;
receiving a request for state information from the consumer;
determining whether the indication is present in the object; and
delivering the state change message as a function of the determination.

* * * * *

UNITED STATES PATENT AND TRADEMARK OFFICE
CERTIFICATE OF CORRECTION

| | | |
|---|---|---|
| PATENT NO. | : 7,275,081 B1 | Page 1 of 1 |
| APPLICATION NO. | : 10/457814 | |
| DATED | : September 25, 2007 | |
| INVENTOR(S) | : Katz et al. | |

It is certified that error appears in the above-identified patent and that said Letters Patent is hereby corrected as shown below:

Column 11, line 48 (Claim 9), "structure wherein the data comprises" should read -- structure, wherein the data structure comprises --

Column 12, line 5 (Claim 9), "relationships, of" should read -- relationships of --

Column 12, line 12 (Claim 9), "with, the" should read -- with the --

Signed and Sealed this

Second Day of November, 2010

David J. Kappos
*Director of the United States Patent and Trademark Office*